United States Patent
Cha et al.

(10) Patent No.: US 11,577,566 B2
(45) Date of Patent: Feb. 14, 2023

(54) COMBINABLE AND DETACHABLE VEHICLE AND METHOD FOR CONTROLLING THE SAME

(71) Applicants: Hyundai Motor Company, Seoul (KR); KIA Motors Corporation, Seoul (KR)

(72) Inventors: Dong Eun Cha, Hwaseong-si (KR); Jin Ho Hwang, Seoul (KR); Sang Heon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 624 days.

(21) Appl. No.: 16/408,323

(22) Filed: May 9, 2019

(65) Prior Publication Data

US 2020/0189340 A1 Jun. 18, 2020

(30) Foreign Application Priority Data

Dec. 12, 2018 (KR) .................. 10-2018-0160017

(51) Int. Cl.
*B60D 99/00* (2009.01)
*B60D 1/24* (2006.01)
(Continued)

(52) U.S. Cl.
CPC .............. *B60D 99/00* (2022.08); *B60D 1/01* (2013.01); *B60D 1/24* (2013.01); *B60D 1/481* (2013.01);
(Continued)

(58) Field of Classification Search
CPC ... B60D 7/00; B60D 1/01; B60D 1/24; B60D 1/481; B62D 47/006; B62D 59/04; G05D 1/0289; G05D 1/0295
See application file for complete search history.

(56) References Cited

U.S. PATENT DOCUMENTS 11,046,313 B2 * 6/2021 Takhirov ........... B60W 30/1819
2011/0202212 A1 * 8/2011 Gatten ..................... B60D 1/64
701/22

(Continued)

FOREIGN PATENT DOCUMENTS

CN 106184226 A 12/2016
CN 107614359 A 1/2018
(Continued)

OTHER PUBLICATIONS

Office Action dated Dec. 1, 2022 in corresponding Chinese Application No. 201910457363.0.

*Primary Examiner* — Ig T An
(74) *Attorney, Agent, or Firm* — Fox Rothschild LLP

(57) ABSTRACT

A combinable and detachable vehicle includes: a front connecting portion and a rear connecting portion provided at a front portion and a rear portion of a vehicle, respectively, and connected to another vehicle when the vehicle is combined with the other vehicle; a front monitoring portion and a rear monitoring portion monitoring a forward area and a rearward area of the vehicle, respectively; and a controller determining whether the other vehicle is connected to the front connecting portion or the rear connecting portion of the vehicle based on information received from the front connecting portion or the rear connecting portion, or the front monitoring portion or the rear monitoring portion, and controlling whether to operate each of a front component and a rear component of the vehicle depending on a direction of the vehicle is connected to the other vehicle.

18 Claims, 6 Drawing Sheets

(51) Int. Cl.
    *B60D 1/01*           (2006.01)
    *B62D 59/04*        (2006.01)
    *B60D 1/48*          (2006.01)
    *G05D 1/02*          (2020.01)
    *B62D 47/00*        (2006.01)

(52) U.S. Cl.
    CPC ........... *B62D 47/006* (2013.01); *B62D 59/04* (2013.01); *G05D 1/0289* (2013.01); *G05D 1/0295* (2013.01)

(56) References Cited

U.S. PATENT DOCUMENTS

| | | | |
|---|---|---|---|
| 2016/0144906 A1* | 5/2016 | Han | B60D 1/62 180/14.2 |
| 2018/0022405 A1* | 1/2018 | Gecchelin | B60D 1/62 701/23 |

FOREIGN PATENT DOCUMENTS

| | | |
|---|---|---|
| JP | 2007001489 A | 1/2007 |
| JP | 2013184584 A | 9/2013 |
| JP | 2018501141 A | 1/2018 |
| KR | 101693938 B1 | 1/2017 |
| KR | 20170133403 A | 12/2017 |
| KR | 10-2018-0047271 A | 5/2018 |

\* cited by examiner

COMBINABLE AND DETACHABLE VEHICLE AND METHOD FOR CONTROLLING THE SAME

CROSS REFERENCE TO RELATED APPLICATION

The present application claims priority to Korean Patent Application No. 10-2018-0160017, filed Dec. 12, 2018, the entire contents of which is incorporated herein for all purposes by reference.

BACKGROUND

1. Technical Field

The present disclosure relates to a combinable and detachable vehicle which is combinable with other vehicles.

2. Description of the Related Art

In accordance with the development of an electric vehicle, a two-seat micro mobility has been proposed in the market. In a case of charging of the electric vehicle, many attempts to facilitate inter-charging of power between vehicles have been made.

A micro mobility travels with a limited function so as to be served as transportation means only. Such a micro mobility may be a two-seat environment.

The contents described as the related art have been provided only to assist in understanding the background of the present disclosure and should not be considered as corresponding to the related art known to those having ordinary skill in the art.

SUMMARY

An aspect of the present disclosure is to provide a combinable and detachable vehicle which is combinable with other vehicles at a front portion and a rear portion thereof, respectively, and effective to control components, driving and charging, and security systems between the vehicles when the vehicles are combined with each other and a method for controlling the same.

According to an embodiment of the present disclosure, a combinable and detachable vehicle, includes: a front connecting portion and a rear connecting portion provided at a front portion and a rear portion of a vehicle, respectively, and connected to another vehicle when the vehicle is combined with the other vehicle; a front monitoring portion and a rear monitoring portion monitoring a forward area and a rearward area of the vehicle, respectively; and a controller determining whether the other vehicle is connected to the front connecting portion or the rear connecting portion of the vehicle based on information received from the front connecting portion or the rear connecting portion of the vehicle, or the front monitoring portion or the rear monitoring portion of the vehicle, and controlling whether to operate each of a front component and a rear component of the vehicle depending on a direction in which the vehicle is connected to the other vehicle.

In a case in which it is detected that the front connecting portion or the rear connecting portion of the vehicle is connected to the other vehicle, the controller may determine that the other vehicle is connected to the front portion of the vehicle when a distance between the vehicle and a front obstacle measured by the front monitoring portion is equal to or less than a predetermined distance, and the controller may determine that the other vehicle is connected to the rear portion of the vehicle when a distance between the vehicle and a rear obstacle measured by the rear monitoring portion is equal to or less than the predetermined distance.

In a case in which it is detected that the front connecting portion or the rear connecting portion of the vehicle is connected to the other vehicle, the controller may determine that other vehicles are connected to the front portion and the rear portion of the vehicle, respectively, when a distance between the vehicle and a front obstacle measured by the front monitoring portion and a distance between the vehicle and a rear obstacle measured by the rear monitoring portion are equal to or less than a predetermined distance.

The controller may end an operation of the front monitoring portion and an operation of the front component of the vehicle when the other vehicle is connected to the front portion of the vehicle.

The controller may end an operation of the rear monitoring portion and an operation of the rear component of the vehicle when the other vehicle is connected to the rear portion of the vehicle.

The controller may end operations of the front monitoring portion, the rear monitoring portion, the front component, and the rear component of the vehicle when other vehicles are connected to the front portion and the rear portion of the vehicle.

The front component may include a front head lamp, a front direction indicator, and a front windshield wiper, and the rear component may include a rear brake lamp, a back up lamp, and a rear direction indicator.

In a case in which it is detected that the front connecting portion or the rear connecting portion of the vehicle is connected to the other vehicle, the controller may determine that the other vehicle is connected to the front portion of the vehicle when a distance between the vehicle and a front obstacle measured by the front monitoring portion is equal to or less than a predetermined distance, may stop an operation of the front monitoring portion and an operation of the front component, and may control the rear monitoring portion and the rear component to be operated.

In a case in which it is detected that the front connecting portion or the rear connecting portion of the vehicle is connected to the other vehicle, the controller may determine that other vehicles are connected to the front portion and the rear portion of the vehicle, respectively, when a distance between the vehicle and a front obstacle measured by the front monitoring portion and a distance between the vehicle and a rear obstacle measured by the rear monitoring portion are equal to or less than a predetermined distance, and may stop operations of the front monitoring portion, the rear monitoring portion, the front component, and the rear component.

The controller may control whether to operate a driving component of the vehicle according to a result of comparison between a driving energy storage amount of the vehicle and a driving energy storage amount of the other vehicle.

The controller may end an operation of the driving component of the vehicle when the driving energy storage amount of the vehicle is smaller than that of the other vehicle.

The controller of the vehicle may give a driving control right to a controller of the other vehicle when the controller of the vehicle stops the operation of the driving component of the vehicle.

The controller may allow a driving energy storage device of the vehicle to be charged with driving energy from the other vehicle when the driving energy storage amount of the vehicle is smaller than that of the other vehicle.

The controller may provide a credit to a controller of the other vehicle by a charge amount when the driving energy storage device of the vehicle is charged with the driving energy from the other vehicle.

The controller may release the connection between the other vehicle and the rear connecting portion of the vehicle when it is determined that the other vehicle is connected to the rear portion of the vehicle and a front collision is predicted by the front monitoring portion.

A controller of the other vehicle disconnected from the rear portion of the vehicle may control a driving component of the other vehicle so that the other vehicle is driven in an opposite direction to a direction in which a collision of the vehicle is predicted.

The controller may release the connection between the front connecting portion of the vehicle and the other vehicle and may control a driving component of the vehicle so that the vehicle is driven in an opposite direction to a direction in which a collision of the vehicle is predicted, when it is determined that the other vehicle is connected to the front portion of the vehicle and a front collision is predicted by the front monitoring portion of the other vehicle.

The controller of the vehicle and a controller of the other vehicle may transmit and receive a command via communication or may share a collision prediction signal and a collision signal with each other.

According to another embodiment of the present disclosure, a method for controlling the combinable and detachable vehicle, the method includes: detecting a connection signal of the front connecting portion or the rear connecting portion of the vehicle; determining that the other vehicle is connected to the front connecting portion or the rear connecting portion of the vehicle based on the information received from the front monitoring portion or the rear monitoring portion of the vehicle; and controlling whether to operate each of the front component and the rear component of the vehicle depending on the direction in which the vehicle is connected to the other vehicle.

DETAILED DESCRIPTION OF EMBODIMENTS

Embodiments of the invention are discussed below with reference to the accompanied drawings.

Micro mobility vehicles have a two-seat configuration, and may be combined to provide a four-seat environment. Additional mobility vehicles may be combined to provide group traveling. Such combining of micro mobility vehicles needs developments in controlling aspects as well as hardware aspects.

Figure 1:
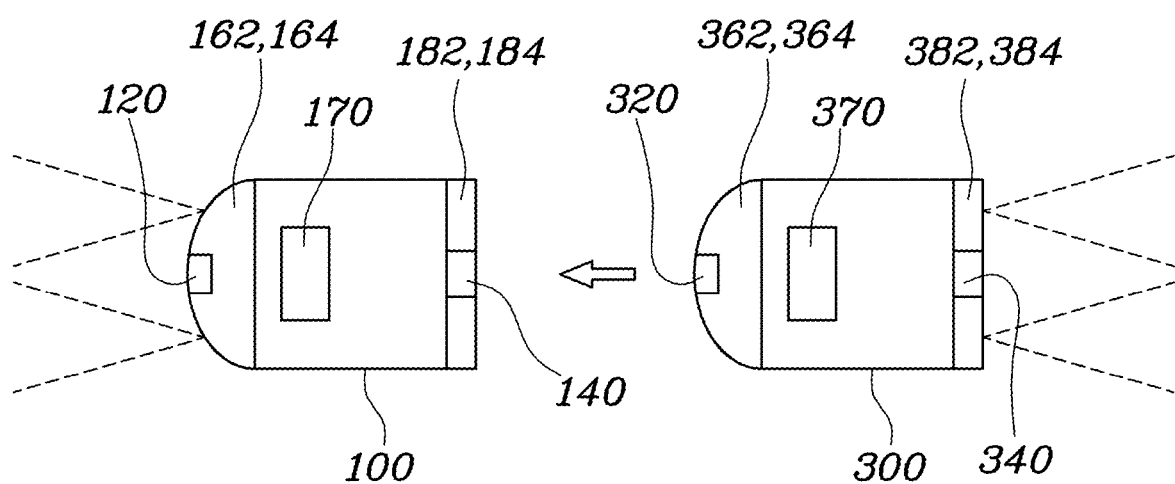
FIG. 1 is a view for describing a combination of combinable and detachable vehicles according to an embodiment of the present disclosure.
Figure 2:
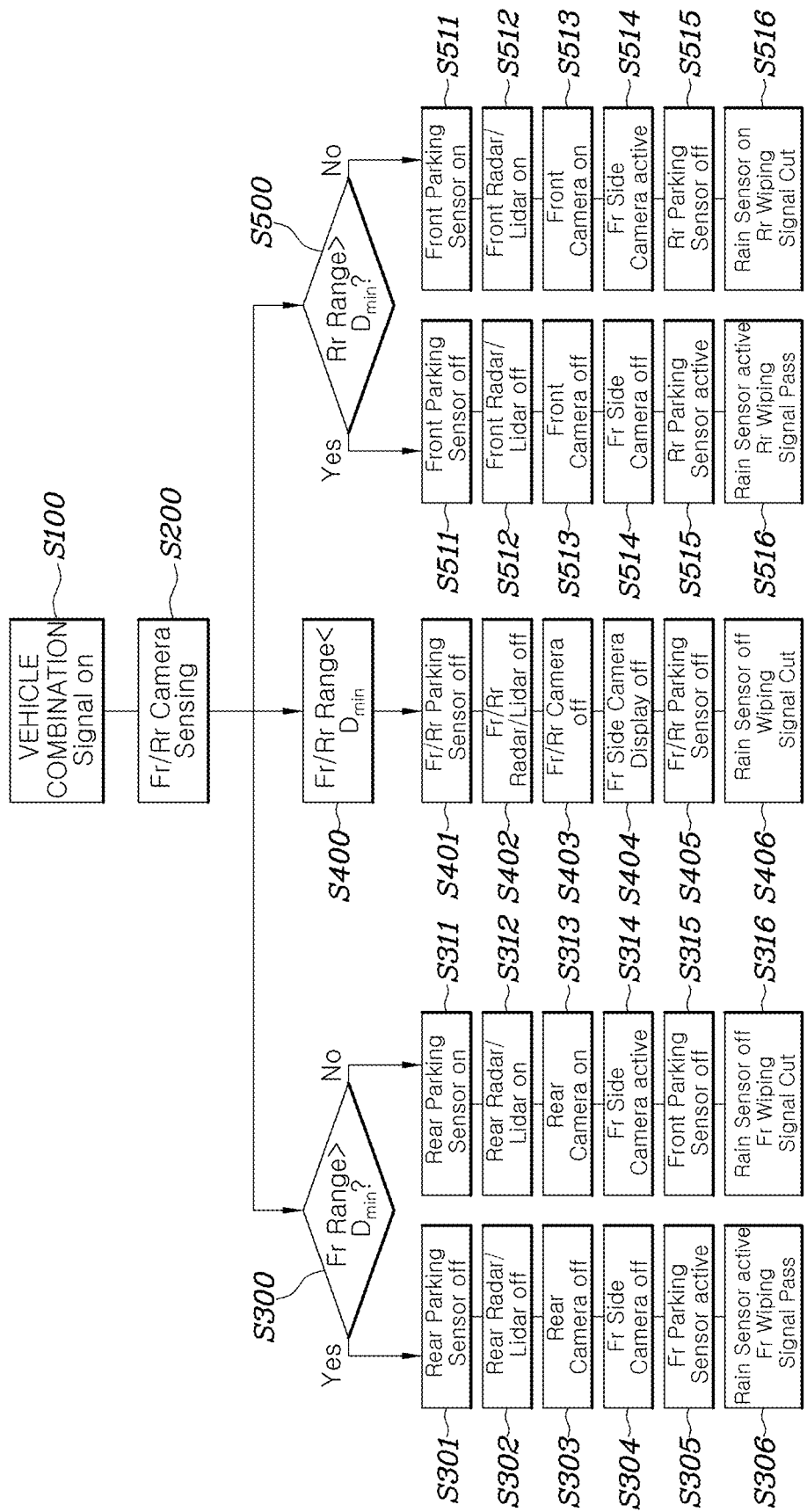
FIGS. 2 to 4 are views illustrating a control relation between a combinable and detachable vehicle and another vehicle according to an embodiment of the present disclosure.
Figure 3:
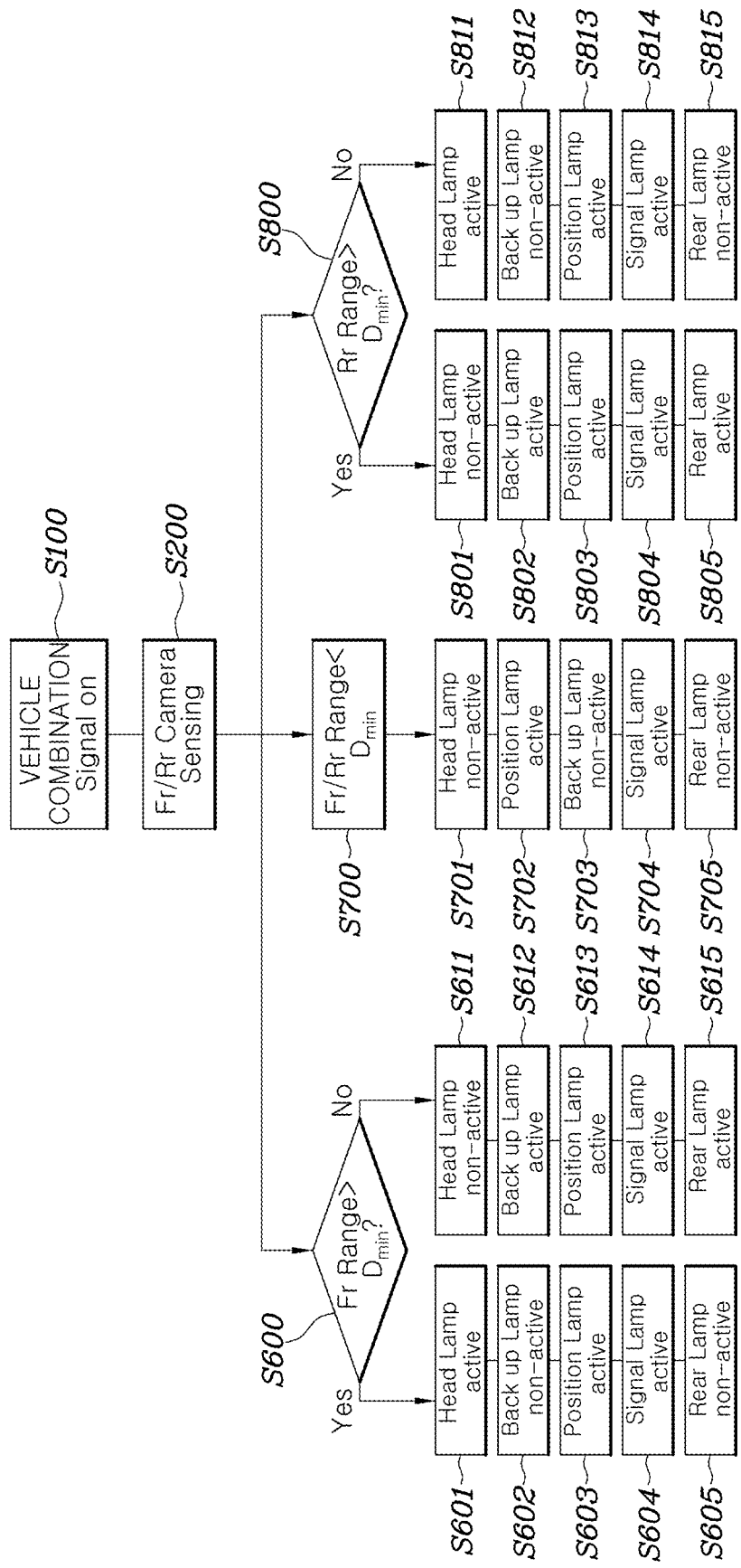
Figure 4:
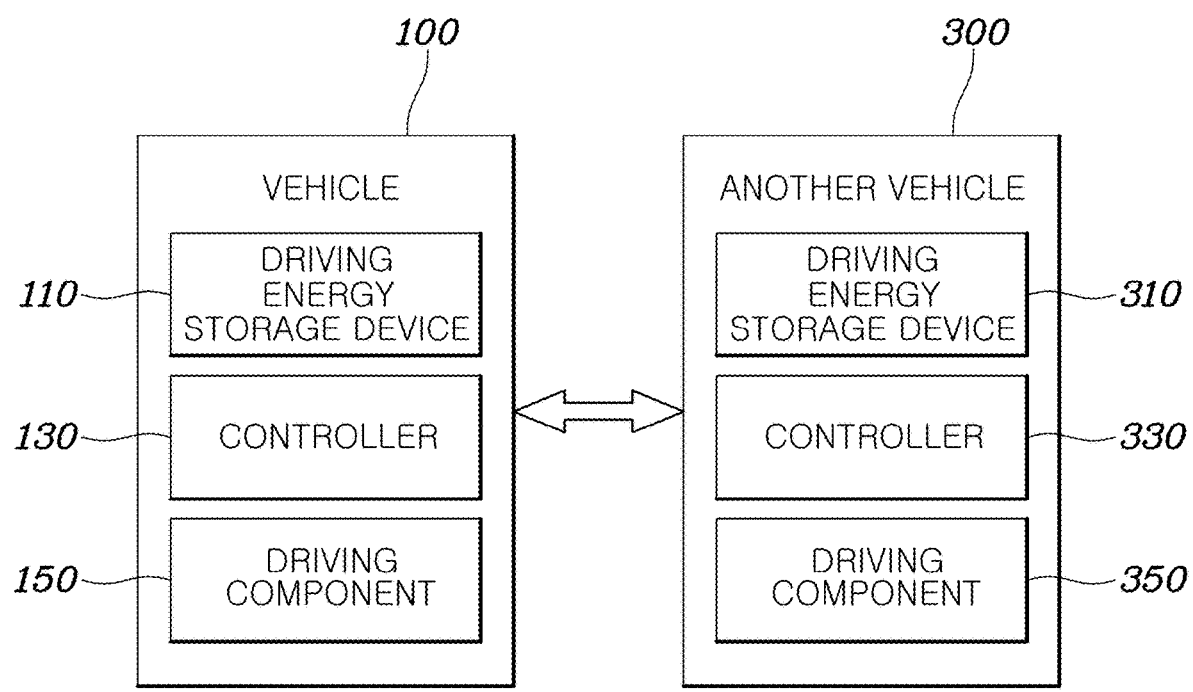
Figure 5:
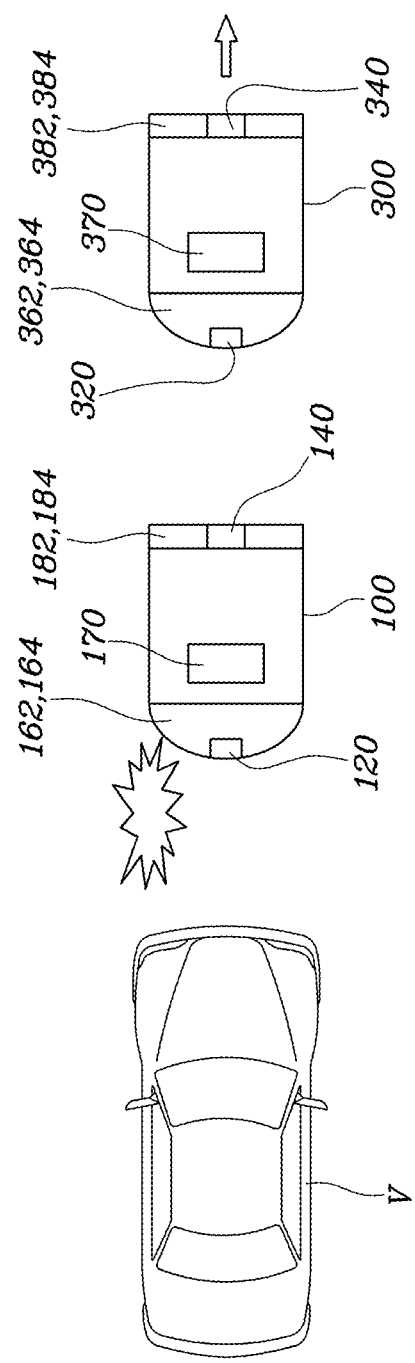
FIGS. 5 and 6 are views illustrating a control of a safety system of a combinable and detachable vehicle according to an embodiment of the present disclosure.
Figure 6:
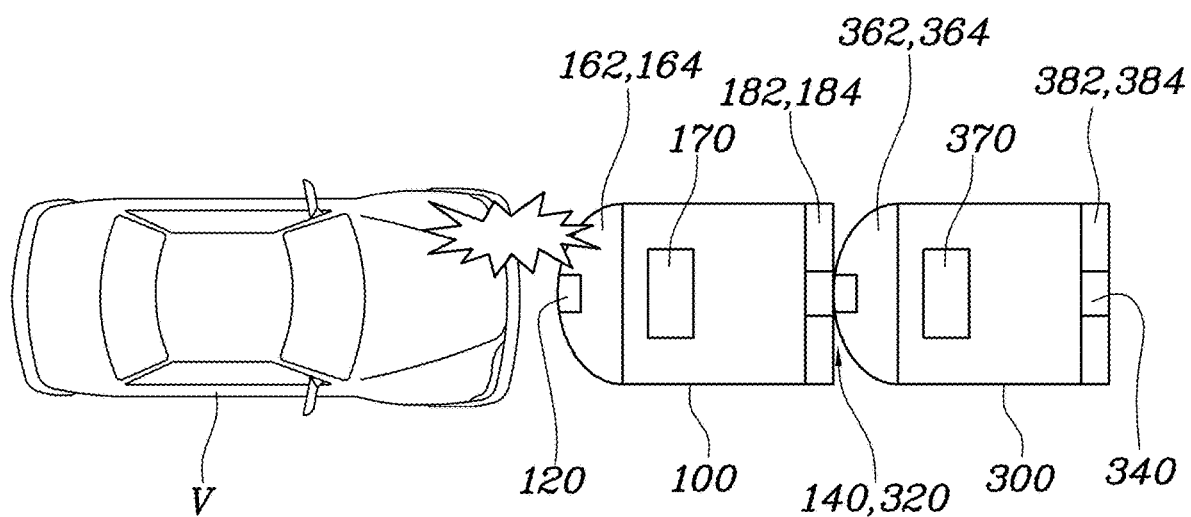

FIG. 1 is a view for describing a combination of combinable and detachable vehicles according to an embodiment of the present disclosure, FIGS. 2 to 4 are views illustrating a control relation between a combinable and detachable vehicle and another vehicle according to an embodiment of the present disclosure, and FIGS. 5 and 6 are views illustrating a control of a safety system of a combinable and detachable vehicle according to an embodiment of the present disclosure.

FIG. 1 is a view for describing a combination of combinable and detachable vehicles according to an embodiment of the present disclosure. The combinable and detachable vehicle according to the present disclosure includes a front connecting portion 120 and a rear connecting portion 140 provided at a front portion and a rear portion of a vehicle 100, respectively, and connected to another vehicle 300 when the vehicle is combined with the other vehicle; a front monitoring portion 162 and a rear monitoring portion 182 monitoring a forward area and a rearward area of the vehicle, respectively; and a controller 130 determining whether the other vehicle is connected to the front connecting portion 120 or the rear connecting portion 140 of the vehicle based on information received from the front connecting portion 120 or the rear connecting portion 140 of the vehicle, or the front monitoring portion 162 or the rear monitoring portion 182 of the vehicle, and controlling whether to operate each of a front component 164 and a rear component 184 of the vehicle depending on a direction in which the vehicle is connected to the other vehicle 300.

The combinable and detachable vehicle according to the present disclosure is suitable for vehicles which is driven by a battery and a motor, such as an electric vehicle, a fuel cell vehicle, or the like and is also suitable for an internal combustion engine vehicle. In addition, it should be noted that the combinable and detachable vehicle is suitable for various device types, but is also suitable for an innovative micro mobility (two-seat vehicle).

In a case of a conventional vehicle, in general, a driver rides their own vehicle and drives only their vehicle. In consideration of a future value of a vehicle, however, there will be situations where several vehicles are combined with each other so as to move and travel together. In this case, basically, the vehicle is provided with a front connecting portion and a rear connecting portion for combination with another vehicle at the front portion and the rear portion of the vehicle, respectively. The front connecting portion and the rear connecting portion may be a mechanical locking device or an electrical locking device. In addition to the locking device, a sensor sensing a locking state may be built in the connecting portion. The sensor is connected to a controller of the vehicle and notifies whether the vehicle is locked to another vehicle or not. A term "vehicle 100" mentioned below is defined as a host vehicle and a term "another vehicle 300" is defined as other vehicle around the host vehicle to be locked to the host vehicle.

To this end, the front connecting portion 120 and the rear connecting portion 140 are provided at the front portion and the rear portion of the vehicle according to the present disclosure, respectively, and connected to another vehicle when the vehicle is combined with the other vehicle. In addition, the vehicle is provided with the front monitoring portion 162 and the rear monitoring portion 182 monitoring the forward area and the rearward area of the vehicle. The front monitoring portion and the rear monitoring portion are various sensors, such as a camera, a radar sensor, a light detection and ranging (LiDAR) sensor, an ultrasonic wave sensor, an infrared ray sensor, and the like, which may measure a distance between the vehicle and an obstacle.

In addition, the controller 130 of the vehicle detects whether the vehicle is locked to the other vehicle 300 at the front portion or the rear portion of the vehicle through the front connecting portion or the rear connecting portion, or the front monitoring portion or the rear monitoring portion, how much distance is between the vehicle and the other vehicle positioned in front of or behind the vehicle, or the like. The controller 130 determines whether the other vehicle is connected to the front connecting portion or the rear connecting portion of the vehicle based on information received. The connection direction may be detected through only the locking state, but also it is possible to perform a more accurate determination of the connection direction by using the front monitoring portion or the rear monitoring portion.

In addition, the controller 130 controls whether to operate each of the front component and the rear component of the vehicle depending on the direction in which the vehicle is connected to the other vehicle 300. In detail, FIGS. 2 to 4 are views illustrating a control relation between a combinable and detachable vehicle and another vehicle according to an embodiment of the present disclosure. In a case in which it is detected that the front connecting portion or the rear connecting portion of the vehicle is connected to the other vehicle, the controller determines that the other vehicle is connected to the front portion of the vehicle when a distance between the vehicle and a front obstacle measured by the front monitoring portion is equal to or less than a predetermined distance, and the controller determines that the other vehicle is connected to the rear portion of the vehicle when a distance between the vehicle and a rear obstacle measured by the rear monitoring portion is equal to or less than the predetermined distance. Further, in a case in which it is detected that the front connecting portion or the rear connecting portion of the vehicle is connected to the other vehicle, the controller may determine that other vehicles are connected to the front portion and the rear portion of the vehicle, respectively, when a distance between the vehicle and a front obstacle measured by the front monitoring portion and a distance between the vehicle and a rear obstacle measured by the rear monitoring portion are equal to or less than a predetermined distance. In embodiment, it is possible for the controller to accurately determine whether the other vehicle is connected to the front portion or the rear portion of the vehicle, or the vehicle is positioned in the middle when three or more vehicles are combined with each other, through such a logic.

In addition, the controller may end an operation of the front monitoring portion and an operation of the front component of the vehicle when the other vehicle is connected to the front portion of the vehicle. The controller may end an operation of the rear monitoring portion and an operation of the rear component of the vehicle when the other vehicle is connected to the rear portion of the vehicle. The controller may end operations of the front monitoring portion, the rear monitoring portion, the front component, and the rear component of the vehicle when other vehicles are connected to the front portion and the rear portion of the vehicle.

As an example, in the case in which the other vehicle is connected to the rear portion of the vehicle, when a tail lamp of the vehicle is turned on, but it does not need to do so, the occupants of the other vehicle may feel uncomfortable. Accordingly, in this case, the tail lamp of the vehicle needs to be not operated, but a tail lamp of the other vehicle needs to be operated. In embodiments, the controller determines that which direction of the vehicle the other vehicle is connected to and ends the control of the monitoring portions or the components of the vehicle which are positioned at the corresponding connection direction, such that unnecessary power consumption is saved and the convenience and the traffic safety of the occupants and the surrounding vehicles are secured.

In detail, the front component 164 may include a front head lamp, a front direction indicator, and a front windshield wiper, and the rear component 184 may include a rear brake lamp, a back up lamp, and a rear direction indicator. A front component 364 and a rear component 384 of the other vehicle 300 may include the same components, similar to the vehicle 100.

In addition, in a case in which it is detected that the front connecting portion or the rear connecting portion of the vehicle is connected to the other vehicle, the controller may determine that the other vehicle is connected to the front portion of the vehicle when a distance between the vehicle and a front obstacle measured by the front monitoring portion is equal to or less than a predetermined distance, may stop an operation of the front monitoring portion and an operation of the front component, and may control the rear monitoring portion and the rear component to be operated. In addition, in a case in which it is detected that the front connecting portion or the rear connecting portion of the vehicle is connected to the other vehicle, the controller may determine that other vehicles are connected to the front portion and the rear portion of the vehicle, respectively, when a distance between the vehicle and a front obstacle measured by the front monitoring portion and a distance between the vehicle and a rear obstacle measured by the rear monitoring portion are equal to or less than a predetermined distance, and may stop operations of the front monitoring portion, the rear monitoring portion, the front component, and the rear component.

FIG. 2 is a flowchart illustrating a control process of the front monitoring portion and the rear monitoring portion. In the case where the vehicle and another vehicle are connected to each other (S100), the controller receives sensor values of a front camera and a rear camera (S200). In the case where a distance between the vehicle and a front obstacle is equal to or more than a predetermined distance ($D_{min}$) (S300), the controller determines that the other vehicle is connected to the rear portion of the vehicle and stops a rear parking sensor, a rear radar, a rear camera, and the like (S301, S302, S303, and S304). In addition, a front parking sensor and a front rain sensor are active and a front wiping signal is passed (S305 and S306). In this case, since a distance between the vehicle and a rear obstacle is equal to or less than the predetermined distance (S500), the front parking sensor, the front radar, the front camera, and a front side camera are active (S511, S512, S513, and S514), and the rear parking sensor is off and a rear wiping signal is cut (S516 and S517).

Meanwhile, in the case where a distance between the vehicle and the rear obstacle is equal to or more than the predetermined distance, the controller determines that the other vehicle is connected to the front portion of the vehicle and controls the front monitoring portion and the rear monitoring portion in an opposite way to that described above (S311 to S316 and S501 to S506). In addition, in the case where the distance between the vehicle and the front obstacle and the distance between the vehicle and the rear obstacle are within the predetermined distance, the controller ends the operations of the front monitoring portion, the rear monitoring portion, and the components (S401 to S406).

Meanwhile, the front component may include a front head lamp, a front direction indicator, and a front windshield wiper, and the rear component may include a rear brake lamp, a back up lamp, and a rear direction indicator. In this case, similarly, in the case where the other vehicle is connected to the front portion of the vehicle, the controller stops all operations of the front components (S611 to S615 and S801 to S805), in the case where the other vehicle is connected to the rear portion of the vehicle, the controller stops all operations of the rear components (S601 to S605 and S811 to S815), and in the case where other vehicles are connected to the front portion and the rear portion of the vehicle, respectively, the controller stops all operations of the front components and the rear components (S701 to S705).

In addition, the controller may control whether to operate a driving component of the vehicle according to a result of comparison between a driving energy storage amount of the vehicle and a driving energy storage amount of the other vehicle. In embodiments, in the case where the driving energy storage amount of the vehicle is smaller than that of the other vehicle, the controller may stop an operation of the driving component of the vehicle. Further, the controller of the vehicle may give a driving control right to a controller of the other vehicle when the controller of the vehicle stops the operation of the driving component of the vehicle.

In detail, FIG. 4 is a view for describing control of driving and charging. In the vehicle 100 and the other vehicle 300, high voltage batteries may be provided as driving energy storage devices 110 and 310, respectively, controllers 130 and 330 may be mounted, and motors may be provided, as driving components 150 and 350, respectively. In addition, as illustrated in FIG. 4, in the case where a charge amount of the vehicle 100 is insufficient in the state in which the vehicle and the other vehicle are connected to each other, the driving is performed by the other vehicle 300 and the charging of the vehicle 100 may be performed from the other vehicle 300. In the illustrated embodiment, the charging of the vehicle 100 is performed and the other vehicle 300 is driven so that the driving is performed in a rear wheel mode in the state in which the vehicle and the other vehicle are combined with each other.

In embodiments, the controller 130 may allow a driving energy storage device 110 of the vehicle to be charged with driving energy from the other vehicle when a driving energy storage amount of the vehicle is smaller than that of the other vehicle. In addition, the controller 130 may provide a credit to the controller 330 of the other vehicle by a charge amount when the driving energy storage device 110 of the vehicle is charged with the driving energy from the other vehicle. In embodiments, the controller of the vehicle and a controller of the other vehicle may transmit and receive a command via communication or may share a collision prediction signal and a collision signal with each other. Through such a communication, it is possible to permit inter-charging between two vehicles and a compensation therefor may be possible by giving a credit.

FIGS. 5 and 6 are views illustrating a control of a safety system of a combinable and detachable vehicle according to an embodiment of the present disclosure. The controller may release the connection between the other vehicle and the rear connecting portion of the vehicle when it is determined that the other vehicle is connected to the rear portion of the vehicle and a front collision is predicted by the front monitoring portion. In embodiments, the vehicle may predict a collision accident by the front monitoring portion or the rear monitoring portion. In the case where a front collision is predicted, the controller may release the combination between the vehicle and the other vehicle 300 and may control the other vehicle to be moved backwards. Since the controllers of the vehicle and the other vehicle are communicated with each other and shared information, when the front collision is predicted at the front vehicle, the controllers release the connection between the rear connecting portion 140 of the vehicle and the front connecting portion 320 of the other vehicle, and the controller of the other vehicle 300 controls the driving components of the other vehicle 300 so that the other vehicle to be moved backwards. In embodiments, a controller of the other vehicle which is disconnected from the rear portion of the vehicle may control the driving components of the other vehicle so that the other vehicle is driven in an opposite direction to a direction in which a collision of the vehicle is predicted.

Further, the controller may release the connection between the front connecting portion of the vehicle and the other vehicle and may control the driving components of the vehicle so that the vehicle is driven in an opposite direction to a direction in which a collision of the vehicle is predicted, when it is determined that the other vehicle is connected to the front portion of the vehicle and a front collision is predicted by the front monitoring portion of the other vehicle.

Meanwhile, as illustrated in FIG. 6, when an unexpected collision occurs in the state where the vehicle and the other vehicle are combined with each other, the controller may control safety devices 170 and 370, such as an air bag of the like, which is provided in each of the vehicles to be operated without separation of two vehicles so as to stochastically most safely protect occupants of the two vehicles 100 and 300. In embodiments, it is necessary to deal with the separation or the driving of the vehicles differently depending on whether a collision is predicted or not.

A method for controlling the combinable and detachable vehicle includes: detecting a connection signal of the front connecting portion or the rear connecting portion of the vehicle; determining that the other vehicle is connected to the front connecting portion or the rear connecting portion of the vehicle based on the information received from the front monitoring portion or the rear monitoring portion of the vehicle; and controlling whether to operate each of the front component and the rear component of the vehicle depending on the direction in which the vehicle is connected to the other vehicle. Since the combinable and detachable vehicle of the present disclosure is described above, a detailed description therefor will be omitted.

According to a combinable and detachable vehicle of the present disclosure and a method for controlling the same, the vehicle may be combinable with other vehicles at the front portion and a rear portion thereof, respectively, and may be effective to control components, driving and charging, and security systems between the vehicles when the vehicles are combined with each other.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although the present disclosure has been shown and described with respect to embodiments, it will be apparent to those having ordinary skill in the art that the present disclosure may be variously modified and altered without departing from the spirit and scope of the present disclosure as defined by the following claims.

What is claimed is:

1. A combinable and detachable vehicle, comprising:
a front connecting portion and a rear connecting portion provided at a front portion and a rear portion of a vehicle, respectively, and configured to be connected to another vehicle;
a front monitoring portion and a rear monitoring portion configured to monitor a forward area and a rearward area of the vehicle, respectively; and
a controller configured to:
determine whether the another vehicle is connected to the front connecting portion or the rear connecting portion of the vehicle based on information received from the front connecting portion or the rear connecting portion of the vehicle, or the front monitoring portion or the rear monitoring portion of the vehicle,
control operation of each of a front component and a rear component of the vehicle depending on which one of the front and rear connecting portions of the vehicle is connected to another vehicle,
give a driving control right to a controller of the another vehicle connected to the vehicle in response to the controller of the vehicle stopping the operation of a driving component of the vehicle, and
provide a credit to a controller of another vehicle connected to the vehicle by a charge amount when the driving energy storage device of the vehicle is charged with the driving energy from the other vehicle.

2. The combinable and detachable vehicle of claim 1, wherein in a case in which it is detected that the front connecting portion or the rear connecting portion of the vehicle is connected to another vehicle, the controller is configured to determine that the other vehicle is connected to the front portion of the vehicle when a distance between the vehicle and a front obstacle measured by the front monitoring portion is equal to or less than a predetermined distance, and the controller is configured to determine that the other vehicle is connected to the rear portion of the vehicle when a distance between the vehicle and a rear obstacle measured by the rear monitoring portion is equal to or less than the predetermined distance.

3. The combinable and detachable vehicle of claim 1, wherein in a case in which it is detected that each of the front connecting portion and the rear connecting portion of the vehicle is connected to another vehicle, the controller is configured to determine that the other vehicles are connected to the front portion and the rear portion of the vehicle, respectively, when a distance between the vehicle and a front obstacle measured by the front monitoring portion and a distance between the vehicle and a rear obstacle measured by the rear monitoring portion are equal to or less than a predetermined distance.

4. The combinable and detachable vehicle of claim 1, wherein the controller is configured to end an operation of the front monitoring portion and an operation of the front component of the vehicle when determined that another vehicle is connected to the front portion of the vehicle.

5. The combinable and detachable vehicle of claim 1, wherein the controller is configured to end an operation of the rear monitoring portion and an operation of the rear component of the vehicle when determined that another vehicle is connected to the rear portion of the vehicle.

6. The combinable and detachable vehicle of claim 1, wherein the controller is configured to end operations of the front monitoring portion, the rear monitoring portion, the front component, and the rear component of the vehicle when determined that other vehicles are connected to the front portion and the rear portion of the vehicle.

7. The combinable and detachable vehicle of claim 1, wherein the front component includes a front head lamp, a front direction indicator, and a front windshield wiper, and the rear component includes a rear brake lamp, a back up lamp, and a rear direction indicator.

8. The combinable and detachable vehicle of claim 1, wherein in a case in which it is detected that the front connecting portion or the rear connecting portion of the vehicle is connected to another vehicle, the controller is configured to determine that the other vehicle is connected to the front portion of the vehicle when a distance between the vehicle and a front obstacle measured by the front monitoring portion is equal to or less than a predetermined distance, stop operation of the front monitoring portion and operation of the front component, and control the rear monitoring portion and the rear component to be operated.

9. The combinable and detachable vehicle of claim 1, wherein in a case in which it is detected that both the front connecting portion and the rear connecting portion of the vehicle are connected to other vehicles, the controller is configured to determine that the other vehicles are connected to the front portion and the rear portion of the vehicle, respectively, when a distance between the vehicle and a front obstacle measured by the front monitoring portion and a distance between the vehicle and a rear obstacle measured by the rear monitoring portion are equal to or less than a predetermined distance, and stop operations of the front monitoring portion, the rear monitoring portion, the front component, and the rear component.

10. The combinable and detachable vehicle of claim 1, wherein the controller is configured to control operation of a driving component of the vehicle depending on a result of comparison between a driving energy storage amount of the vehicle and a driving energy storage amount of another vehicle connected to the vehicle.

11. The combinable and detachable vehicle of claim 10, wherein the controller is configured to end operation of the driving component of the vehicle when the driving energy storage amount of the vehicle is smaller than that of another vehicle connected to the vehicle.

12. The combinable and detachable vehicle of claim 11, wherein the controller of the vehicle is configured to give a driving control right to a controller of another vehicle connected to the vehicle when the controller of the vehicle stops the operation of the driving component of the vehicle.

13. The combinable and detachable vehicle of claim 10, wherein the controller is configured to allow a driving energy storage device of the vehicle to be charged with driving energy from another vehicle connected to the vehicle when the driving energy storage amount of the vehicle is smaller than that of the other vehicle.

14. The combinable and detachable vehicle of claim 1, wherein the controller is configured to release the connection between another vehicle connected to the vehicle and the rear connecting portion of the vehicle when it is determined that the other vehicle is connected to the rear portion of the vehicle and a front collision is predicted by the front monitoring portion.

15. The combinable and detachable vehicle of claim 14, wherein a controller of the other vehicle disconnected from the rear portion of the vehicle is configured to control a driving component of the other vehicle so that the other vehicle is driven in an opposite direction to a direction in which a collision of the vehicle is predicted.

16. The combinable and detachable vehicle of claim 1, wherein the controller is configured to release the connection between the front connecting portion of the vehicle and another vehicle connected to the vehicle and control a driving component of the vehicle so that the vehicle is driven in an opposite direction to a direction in which a collision of the vehicle is predicted, when it is determined that the other vehicle is connected to the front portion of the vehicle and a front collision is predicted by the front monitoring portion of the other vehicle.

17. The combinable and detachable vehicle of claim 1, wherein the controller of the vehicle and a controller of another vehicle connected to the vehicle are configured to transmit and receive a command via communication or share a collision prediction signal and a collision signal with each other.

18. A method for controlling the combinable and detachable vehicle of claim 1, the method comprising:
   detecting a connection signal of the front connecting portion or the rear connecting portion of the vehicle;
   determining that the other vehicle is connected to the front connecting portion or the rear connecting portion of the vehicle based on the information received from the front monitoring portion or the rear monitoring portion of the vehicle;
   controlling operation of each of the front component and the rear component of the vehicle depending on the direction in which the vehicle is connected to the other vehicle;
   share, in response to the controller of the vehicle stopping the operation of a driving component of the vehicle, a driving control right to a controller of the other vehicle connected to the vehicle; and
   provide, in response to charging the driving energy of the storage device of the vehicle with driving energy from the another vehicle, a credit to a controller of another vehicle by a charge amount.

* * * * *